(12) United States Patent
Bradley, Jr. et al.

(10) Patent No.: US 8,702,283 B2
(45) Date of Patent: Apr. 22, 2014

(54) CONCEALED VACUUM AIR FLOW REFLECTOR LIGHT FIXTURE

(75) Inventors: Aubrey Ray Bradley, Jr., La Habra, CA (US); Robert Gordon Andersen, Laughlin, NV (US)

(73) Assignee: Growlite, Inc., Phoenix, AZ (US)

(*) Notice: Subject to any disclaimer, the term of this patent is extended or adjusted under 35 U.S.C. 154(b) by 413 days.

(21) Appl. No.: 13/106,772

(22) Filed: May 12, 2011

(65) Prior Publication Data

US 2012/0230035 A1   Sep. 13, 2012

Related U.S. Application Data

(60) Provisional application No. 61/451,892, filed on Mar. 11, 2011.

(51) Int. Cl.
 *F21V 7/20*    (2006.01)
 *F21V 7/00*    (2006.01)
 *F21V 29/02*   (2006.01)

(52) U.S. Cl.
 CPC .................. *F21V 7/20* (2013.01); *F21V 7/0025* (2013.01); *F21V 29/02* (2013.01); *F21V 29/022* (2013.01)

USPC ............ 362/345; 362/218; 362/294; 362/373

(58) Field of Classification Search
 CPC ......... F21V 3/005; F21V 7/0025; F21V 7/20; F21V 29/02; F21V 29/022
 USPC .......... 362/96, 149, 218, 294, 345, 373; 52/28
 See application file for complete search history.

(56) References Cited

U.S. PATENT DOCUMENTS

| | | |
|---|---|---|
| D447,272 S | 8/2001 | Smith |
| D544,987 S | 6/2007 | Hargreaves |
| D545,484 S | 6/2007 | Hargreaves |
| 7,524,090 B2 | 4/2009 | Hargreaves |
| 7,534,011 B2 * | 5/2009 | Townsley ................... 362/294 |
| 7,641,367 B2 | 1/2010 | Hargreaves et al. |
| D634,468 S | 3/2011 | Hargreaves |
| D634,469 S | 3/2011 | Hargreaves |
| 2008/0117617 A1 | 5/2008 | Hargreaves et al. |
| 2009/0310373 A1 * | 12/2009 | Burkhauser ................... 362/373 |
| 2010/0277929 A1 | 11/2010 | Hargreaves et al. |

* cited by examiner

*Primary Examiner* — Stephen F Husar
(74) *Attorney, Agent, or Firm* — Marc E. Hankin; Kevin Schraven; Hankin Patent Law, APC (57) ABSTRACT

The invention is a grow light with reflectors that serve to conceal a vacuum air flow system. The air flow system does not interfere with the reflectors, which enables the reflectors to more efficiently reflect light to the plants being grown.

17 Claims, 5 Drawing Sheets

CONCEALED VACUUM AIR FLOW REFLECTOR LIGHT FIXTURE

CROSS-REFERENCE TO RELATED APPLICATIONS

Priority is claimed to U.S. Provisional Patent Application Ser. No. 61/451,892 filed on Mar. 11, 2011, titled "Concealed Vacuum Air Flow Reflector Light Fixture," by inventor Aubrey Ray Bradley Jr. and Robert Gordon Andersen, the contents of which are expressly incorporated herein by this reference.

FIELD OF INVENTION

The invention is a device, method, and system for reflecting light. More particularly, the invention relates to a reflecting and magnifying light fixture with a concealed vacuum air flow system and duct.

BACKGROUND

For decades, grow lights have been used by gardeners to grow plants within the convenience of the home. A grow light is an electric light or lamp that is designed to stimulate plant growth by emitting an electromagnetic spectrum appropriate for photosynthesis. Typically, the lights provide light in a spectrum that is similar to what is delivered from the sun. Outdoor sun conditions are replicated within an indoor space via lamps and lights with varying lumen, temperature, and output. Indoor growing is becoming more and more important because of urban sprawl and the continuing commercial development of farmland. Further, indoor growing has fewer pesticides due to better pest control indoors.

One of the major challenges facing those using grow lights is that the closer the light is to the plant, the more heat the plant receives, but the farther away the light is to the plant, the less light the plant receives. This has led to numerous techniques and devices to try to use the light generated as efficiently as possible, so that the plant can be placed some distance away from the light so that it is not damaged by the heat generated by the bulb.

One of the most common devices to optimize the efficiency of the light is the use of reflectors or magnifying systems. Other techniques include grouping plants and/or lights closely together to minimize the light that does not hit the plants or covering the growing room or box with reflective material.

Current grow lights are limited because the reflector systems are not efficient and/or they give off an immense and detectable heat signature. In order to reduce the detectable heat signature of the light, and to extend the life of the bulb, air flow systems are used to dissipate the heat generated by the grow light. Unfortunately, the air flow system itself interferes with the reflecting system and causes inefficiencies.

Thus, what is needed is a grow light with a reflector and a concealed vacuum air flow system that overcomes these limitations.

SUMMARY OF THE INVENTION

To minimize the limitations in the prior art, and to minimize other limitations that will become apparent upon reading and understanding the present specification, the present invention is grow light with an efficient reflector and a concealed vacuum air flow system.

One embodiment of the invention is a light fixture comprising: a hood; one or more reflectors; and one or more light sources. The hood is comprised of a plurality of openings and an interior surface. The plurality of hood openings is comprised of a front opening and one or more duct openings. The one or more reflectors are positioned between the interior surface of the hood and the one or more light sources such that a light emitted by the one or more light sources is substantially prevented from reaching an in interior surface of the hood and wherein the light is substantially reflected by the one or more reflectors out of the front opening. The one or more positioned reflectors creates a front light area and a back dark area in the hood. The one or more reflectors have a plurality of concealed openings that allow the passage of air between the back dark area and the front light area. Preferably the one or more duct openings are connected to an air flow system that causes air to flow into and out of the hood. The light fixture may also include a front covering, which is preferably transparent. The front covering also creates an air flow chamber within the hood. The reflectors typically have a curved concave shape to maximize the efficiency of the reflectors. The one or more light sources is comprised of a light bulb socket and a light bulb. The concealed openings preferably include a concealed top opening, a concealed socket opening, and one or more concealed corner openings. The concealed socket opening may be adapted to fit around the light bulb socket such that when the light bulb is connected so the light bulb socket, the concealed socket opening is substantially concealed from view. The reflectors preferably include a top reflector, which is positioned to substantially conceal the concealed top opening. The top reflector is preferably tilted to reflect the light around the light bulb and to prevent the light from reflecting back to the light bulb, thus cancelling that light out. The reflectors may also include one or more corner reflectors, which are preferably positioned to substantially conceal one or more concealed corner openings. The primary purpose of the light fixture is to promote the growth of plants. The light fixture may also include a power source or power adapter. Preferably the light fixture may be suspended using a suspension device. The front covering is typically a hinged door that when opened allows access to the light bulb.

Another embodiment of the invention is a light fixture comprising: a hood; a front covering; a light bulb; a light bulb socket; and a plurality of reflectors. The plurality of reflectors include of a top reflector, a plurality of curved side reflectors, and a plurality of curved concealing corner reflectors. The hood is substantially hollow and has a front opening, an air flow duct inlet opening, an air flow duct outlet opening, and an interior surface. The curved side reflectors are positioned within the hollow hood between the interior surface of the hood and the light bulb such that a light emitted by the light bulb is substantially prevented from reaching, (1) the interior surface of the hood, (2) the air flow duct outlet opening, and (3) the air flow duct inlet opening. Instead, the light is substantially reflected by the plurality of reflectors out of the front opening. The side reflectors are positioned within the hollow hood such that there is a top opening and a plurality of corner openings between the plurality of side reflectors. The curved concealing corner reflectors are positioned within the hollow hood to conceal the plurality of corner openings such that a plurality of concealed corner openings are created, and wherein air is permitted to flow through the plurality of concealed corner openings. Preferably, the top reflector is positioned within the hollow hood so as to conceal the top opening such that a concealed top opening is created, and wherein air is permitted to flow through the concealed top opening. The air flow duct inlet opening and the air flow duct outlet opening are connected to an air flow system that causes air to flow into the air flow duct inlet opening and causes air to flow out of the air flow duct outlet opening. The front covering is preferably transparent and creates an air flow chamber within the hollow hood. The curved side reflectors and curved concealing corner reflectors are preferably substantially concave. In order to accommodate the light bulb and light bulb socket, one of the side reflectors might have a concealed socket opening, which is adapted to fit around the light bulb socket such that when the light bulb is connected to the light bulb socket, the concealed socket opening is substantially concealed. Preferably, the top reflector is tilted in s "v" shape to reflect the light around the light bulb and to prevent the light from reflecting back to the light bulb. The front covering may be a hinged door that when opened, allows access to the light bulb. The light fixture may also include a power source, such as a battery or an A/C adapter and a suspension device.

The reflectors are preferably placed in the hood to optimize the magnification and reflection of the light from the light bulb and yet still allow substantial air flow within the hood. The standard hood has two duct holes, one to allow air in and the other to allow air out. The holes are typically directly across from each other to allow the air to easily flow into and out of the hood. Prior art reflectors are positioned within a hood such that the air may flow directly through the hood, to the light bulb and then out of the outlet. In the present invention, the reflectors block the direct flow of air and cause the air to flow through concealed openings to cool the light bulb. When the air is allowed to flow directly through the hood in an unblocked manner, the reflectors are not placed in the most efficient position to reflect or otherwise magnify the light from the light bulb.

In the present invention, air is allowed to flow through openings in the reflectors, but the openings are concealed with other reflectors that block the light from inefficiently escaping into the holes and instead they reflect the light out of the front opening.

Although the light bulb is preferably oriented horizontally, the bulb may be oriented vertically, coming down from a top reflector hole. This embodiment might provide a more universal light distribution.

The light fixture of the present invention enables at least a forty percent (40%) reduction in wattage to be used to generate the same growing power as opposed to currently available light fixtures. This has several enormously beneficial effects. First, the fixture is able to generate 40% more light output at the same wattage as currently available light fixtures, which significantly increases crop yields. Second, the user may use 40% less light fixtures for growing the same number of plants. Third, the invention has an energy savings of 40% per fixture, which significantly lowers the cost of growing plants. Fourth, these cost savings enable the price of produce sold by a grower using the present invention to be significantly reduced. Finally, because the light output of each fixture is 40% greater than currently available light fixtures, fewer fixtures are required to achieve the desired light levels that the plants being grown require. Accordingly, the cost of produce grown using the fixture is significantly lowered.

The concealed vacuum system of the present invention also improves safety, because it drastically lowers the temperature of the fixture and lens. Were the temperature of the fixture not lowered by the concealed vacuum system, the heat generated might cause a dry flammable material that contacted the fixture to catch on fire from the excessive heat.

The concealed vacuum system cools the lamp, which enables the lamp to maintain its original brightness longer, thus saving on maintenance costs and increasing plant yields.

It is an object of the present invention to overcome the limitations of the prior art.

It is an object of the present invention to provide a grow light with both an air flow system and an efficient reflector system, wherein the air flow system does not interfere with the reflector system.

It is an object of the invention to provide an efficient, easy to use, and easy to set up grow light.

Additional embodiments of the invention will be understood from the detailed description of the invention.

DETAILED DESCRIPTION OF THE DRAWINGS

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the screen shot figures, and the detailed descriptions thereof, are to be regarded as illustrative in nature and not restrictive. Also, the reference or non-reference to a particular embodiment of the invention shall not be interpreted to limit the scope of the invention.

Figure 1:
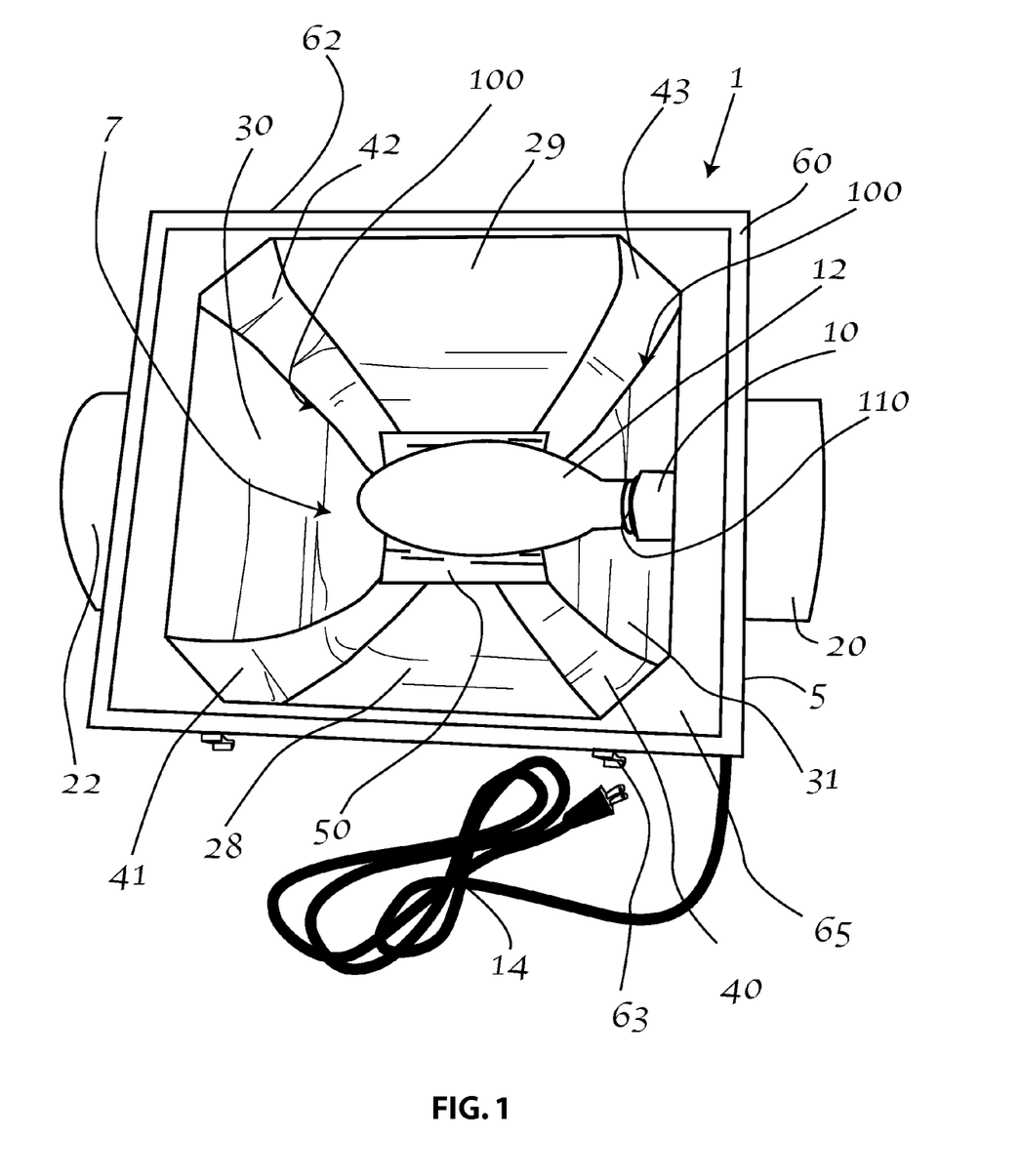
FIG. 1 is an illustration of a front view of one embodiment of the light fixture.

FIG. 1 is an illustration of a front view of one embodiment of the light fixture. As shown in FIG. 1, light fixture 1 preferably includes hood 5, front opening 7, light bulb socket 10, light bulb 12, A/C power adapter 14, air flow duct outlet opening 20, air flow duct inlet opening 22, curved side reflectors 28, 29, 30, and 31, curved concealing corner reflectors 40, 41, 42, and 43, top reflector 50, front covering 60, hinge 62, latch 63, front frame 65, concealed side openings 100, and concealed light bulb socket opening 110. The hood may be any three dimensional shape without deviating from the scope of the invention. FIG. 1 shows how the reflectors are curved around an interior of the hood such that the light emitted from light bulb 12 is substantially reflected out through front covering 60. The reflectors substantially prevent light from reaching the interior of the hood 5. In this manner the light from the light bulb is used very efficiently. FIG. 1 shows that there are preferably four curved side reflectors 28, 29, 30, and

31, but any number of reflectors may be used without deviating from the scope of the invention, so long the light is efficiently reflected out of the front opening 7.

Figure 5:
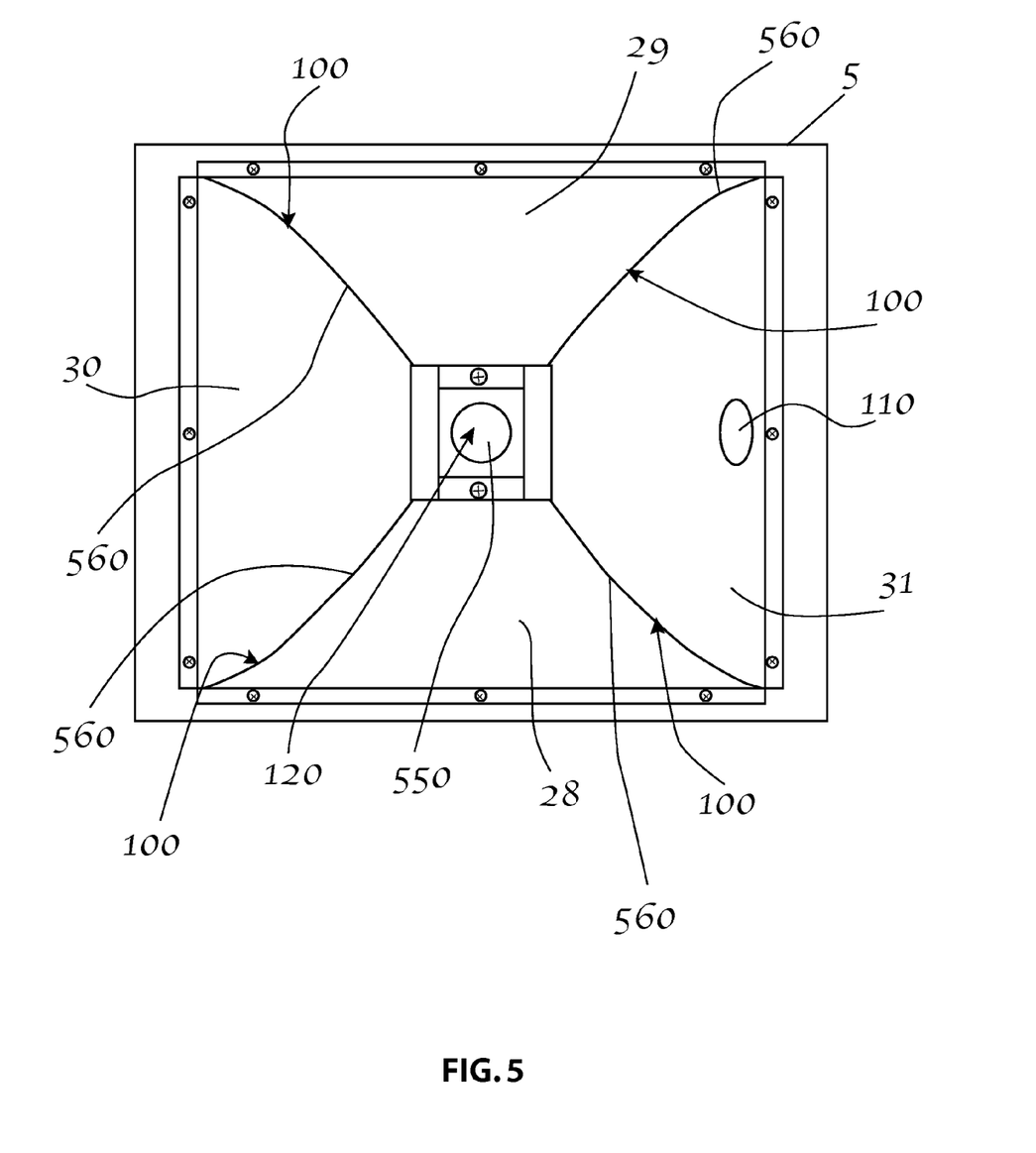
FIG. 5 is an illustration of one embodiment of the light fixture and shows the concealed openings.

FIG. 1 also shows how curved concealing corner reflectors 40, 41, 42, and 43 cover the joints 560 of the curved side reflectors 28, 29, 30, and 31 and conceal the concealed side openings 100 (the joints 560 of the side reflectors 28, 29, 30, and 31 are shown in FIG. 5). The curved concealing corner reflectors 40, 41, 42, and 43, not only cover the joints 560 and conceal the side openings 110, but they may also smooth out the reflective surface created within the hollow interior of hood 5 and more efficiently reflect light out of front opening 7.

The image of the bulb that is reflected out of the front opening 7 is stretched due to the parabolic nature of the reflector though unbroken vertical lines from the light bulb socket 10 and the images are multiplied and magnified by the segments formed by the unbroken lines within each facet of each reflector 28, 29, 30, 31, 40, 41, 42, 43, and 50. The apertures or concealed openings 100, 110, and 120 are preferably polygonal and/or elliptical. The concealed openings 100, 110, and 120 allows hot air to escape the reflector chamber and to be replaced by cool air from the air flow going into and out of the air flow duct outlet and inlet openings 20 and 22. This keeps the area surrounding the light bulb 12 as cool as possible. This increases life span of light bulb 12.

The hood is preferably made out of metal, but any material may be used without deviating from the scope of the invention. The front covering is preferably transparent glass, but any transparent and heat resistant material may be used. The reflectors are preferably shined and polished aluminum that is flexible and reflective, but any flexible and reflective material may be used for the reflectors. The light source is preferably a single light bulb, as shown, but numerous light sockets and light bulbs may be used, as is preferred if light emitting diodes (LED) are used. Any type of lamp, bulb, or light source may be used, including, but not limited to, LED, fluorescent, induction, incandescent, high-output fluorescent, compact fluorescent, high-output fluorescent/high-intensity discharge hybrids, high-pressure sodium (HPS), combination metal halide (MH) and HPS, metal halide, and/or high intensity discharge, without deviating from the scope of the invention.

Light fixture 1 provides significantly more foot candles on the target zone in front of front covering 60 as compared to currently available grow light fixtures. The light fixture 1 may be placed in any position between vertical or horizontal, relative to the plant being grown.

Figure 2:
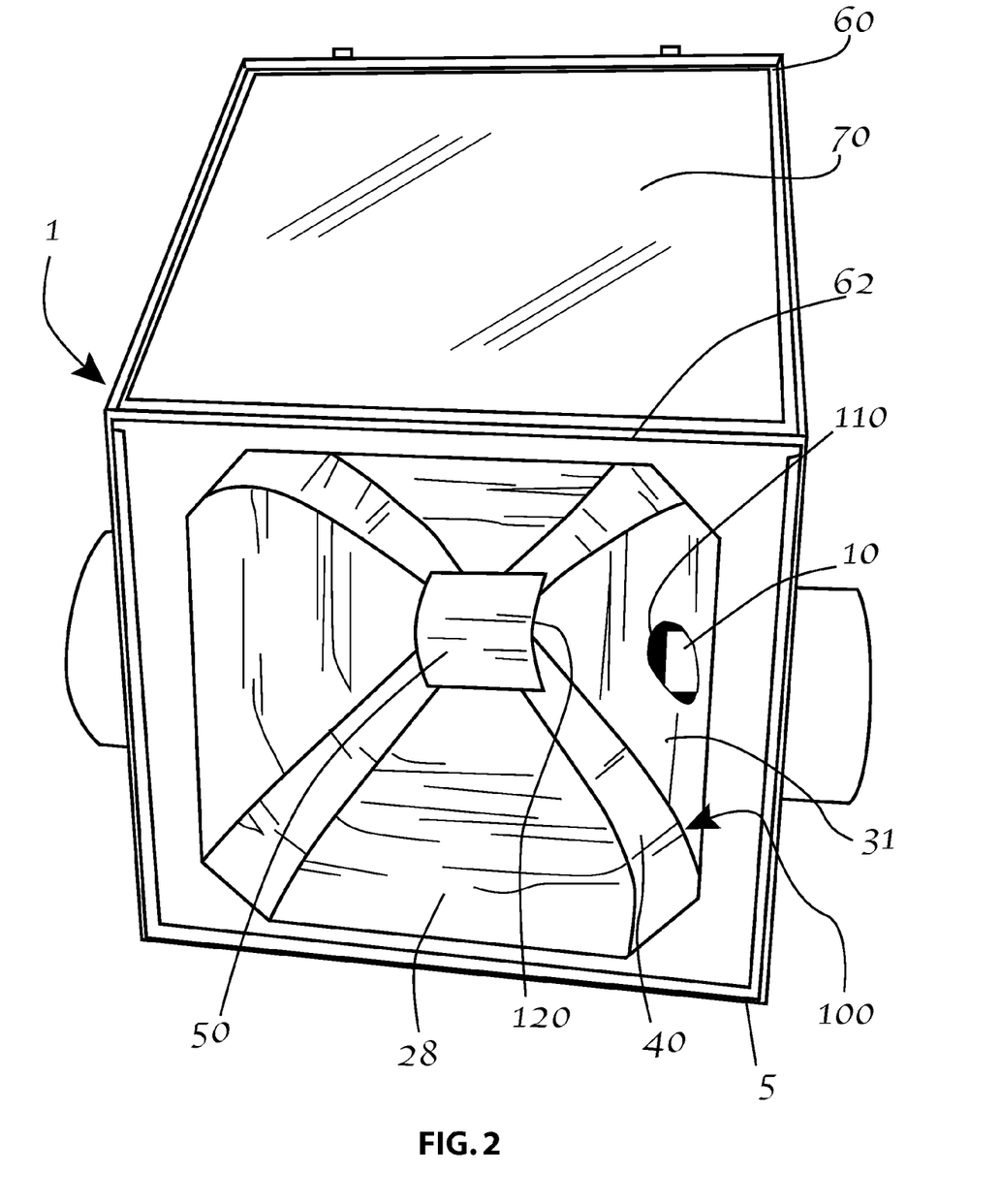
FIG. 2 is an illustration of a front view of one embodiment of the light fixture and shows the front covering open.

FIG. 2 is an illustration of a front view of one embodiment of the light fixture and shows the front covering open. FIG. 2 shows that front covering 60 is a hinged door that is may be opened in order to access the interior of the hood and change or remove the light bulb 12. FIG. 2 also shows how light bulb socket 10 extends through concealed socket opening 110. When light bulb 12 is connected to socket 10, the socket opening 110 is substantially concealed.

FIG. 2 also shows that the center or top reflector 50 is preferably bent or tilted in a v-shape to direct the reflected light away from the bulb and not back into the bulb. This better enables the light emitted from the back of the bulb to exit out the front opening 7 and not be lost when it is reflected back into the bulb.

Figure 3:
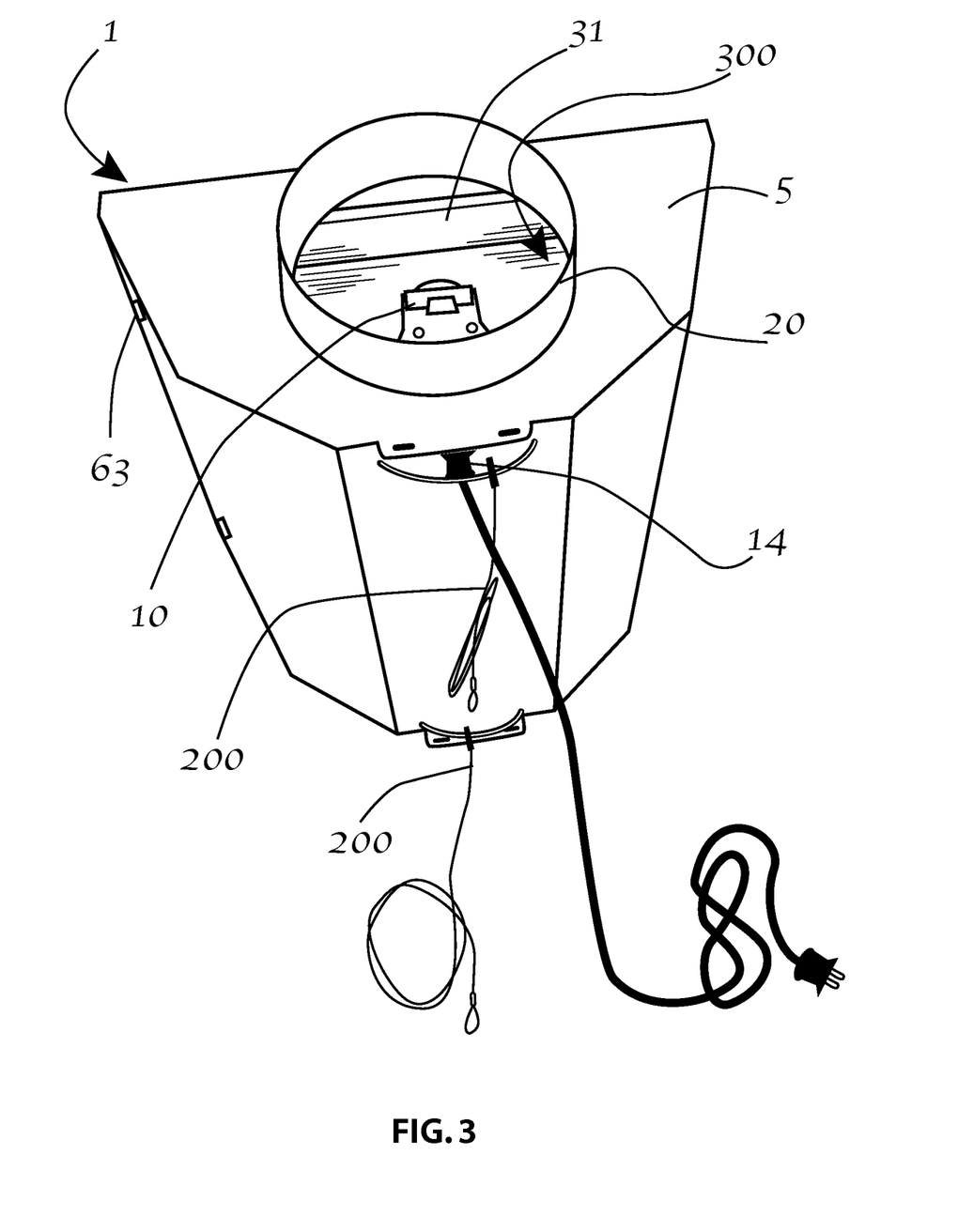
FIG. 3 is an illustration of a back view of one embodiment of the light fixture.

FIG. 3 is an illustration of a back view of one embodiment of the light fixture. As shown in FIG. 3, the light fixture 1 is preferably comprised of hood 5, light bulb socket 10, A/C adapter 14, air flow duct outlet opening 20, curved side reflector 31, latch 63, suspension device 200, and back dark area 300. FIG. 3 shows how the hood 5 is preferably powered by connecting to the power grid. However, the hood 5 may be powered through any means, including a battery. The hood 5 may be suspended from a wall or a ceiling using suspension device 200, which, as shown, is typically a flexible cable system. Suspension device 200 may be any device that allows the light fixture 1 to be hung or otherwise positioned on a structure. FIG. 3 also shows how light fixture 1 may be easily connected to an air duct system. Latch 63 is preferably a Nielsen/Session latch as show, but any closure device may be used without deviating from the scope of the invention. FIG. 3 also shows how hood 5 is preferably substantially hollow and deep structure that allows room for the air flow, reflectors and light bulbs.

Figure 4:
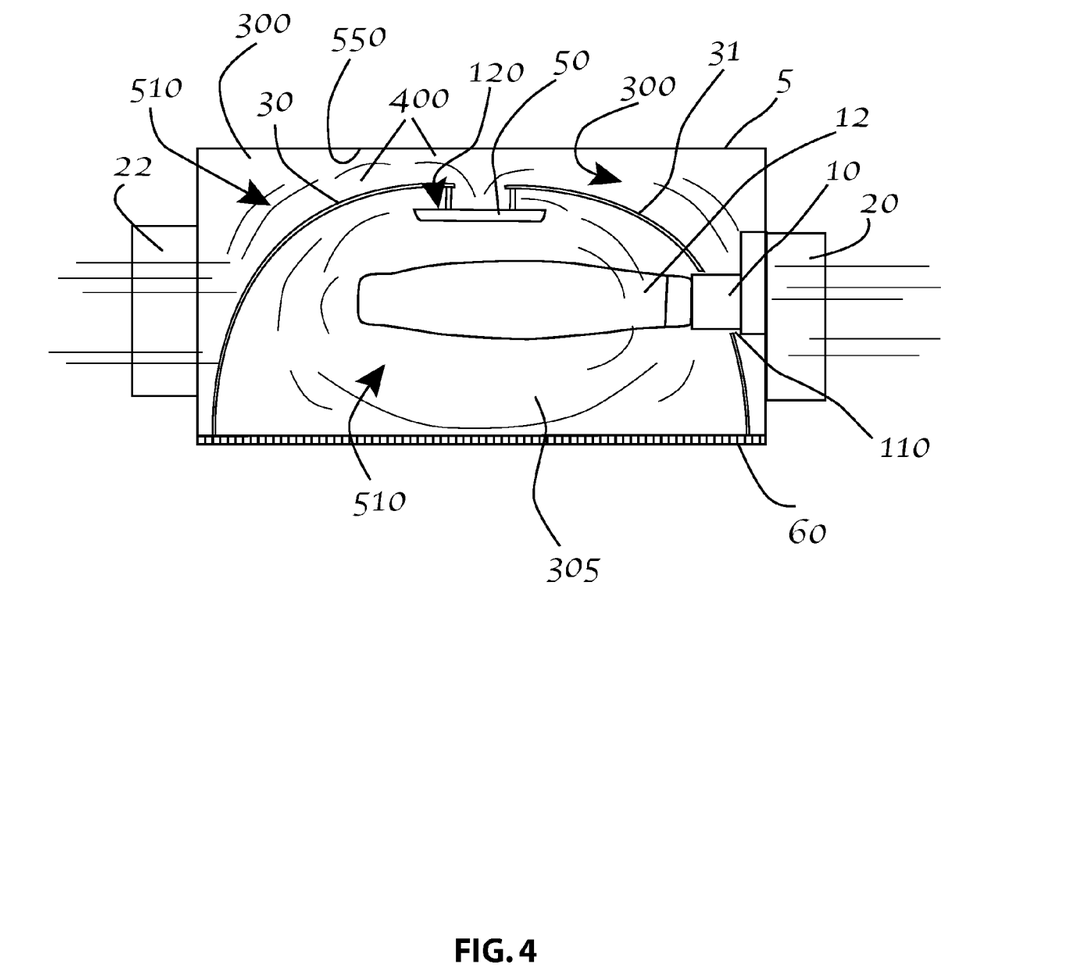
FIG. 4 is an illustration of a cross-section view of one embodiment of the light fixture.

FIG. 4 is an illustration of a cross-section view of one embodiment of the light fixture. FIG. 4 shows how the curved side reflectors 30 and 31 are preferably concave and smooth so as to better reflect the light from light bulb 12 out of the front opening 7. The reflectors divide the interior space of the hood 5 into a light front area 305 and a dark back area 300. FIG. 4 shows how the concealed openings, including top concealed opening 120, allows the movement of air 510 within the light fixture 1 so that the light bulb (or lamp) 12 is cooled and heat generated by the light bulb 12 is dissipated out of the air flow duct outlet opening 20. The air 510 enters through air flow duct inlet opening 22. The air 510 is then blocked by curved side reflector 30, and forced to go around and/or over the back side of the side reflectors 28, 29, 30, and 31. As shown in FIG. 4, the air 510 is able to pass through concealed top opening 120 and concealed socket opening 110 to enter into the light front area 305, where it cools the light bulb 12. FIG. 4 shows how top reflector 50 overlaps with the side reflectors to allow the passage of air 510 between the light front area 305 and back dark area 300, while at the same time, substantially prevent the passage of light between the light front area 305 and back dark area 300. The air 510 then passes out of the light front area 305 through the concealed top opening 120 and concealed socket opening 110. The air 510 exits the light fixture out of air flow duct outlet opening 20. Although not shown in FIG. 4, the air 510 also passes into and out of concealed side openings 100. It should be understood that the air flow duct inlet opening 22 and the air flow duct outlet opening 20 may be in any position relative to the reflectors and light source without deviating from the scope of the invention. Preferably, front cover 70 is closed to create an efficient air flow chamber within hood 5. The light fixture 1 may be hooked up to any type of air flow system, so long as cool air is drawn or pushed into said light fixture 1. Preferably, the air flow system has a fan within a duct that is downstream from the air flow, which draws air out of the light fixture 1, which in turn creates a creates a vacuum that draws air into light fixture 1.

FIG. 4 also shows an interior surface 550 of hood 5.

FIG. 5 is an illustration of one embodiment of the light fixture and shows the concealed openings. As shown in FIG. 5, when top reflector 50 and curved concealing corner reflectors 40, 41, 42, and 43 are removed, the concealed openings are visible. The concealed openings increase the efficiency of the reflecting system while at the same time allowing the vacuum air flow system to cool the light bulb 12. As shown in FIG. 5, preferably the curved side reflectors 28, 29, 30, and 31 are substantially pyramid shaped parabolic segmented reflectors, which magnify and multiply the light output.

Without the corner reflectors 40, 41, 42, and 43, the joints 560 between the side reflectors are visible. Although these joints 560 may be substantially airtight, they preferably are not airtight, and act as concealed side openings 100, which allow air 510 to pass through. When top reflector 50 is absent the top concealed opening 120 is visible. The interior surface 550 of hood 5 is also visible.

As shown in FIG. 1, with the curved concealing corner reflectors 40, 41, 42, and 43, the joints 560 between the side reflectors are not visible. The curved concealing corner reflectors 40, 41, 42, and 43, overlap with the curved side reflectors 28, 29, 30, and 31 to create concealed side openings 100 that allow the flow of air 510, and create a seamless reflecting system that efficiently reflects light to the front opening 7.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

We claim:

1. A light fixture, comprising
a hood;
one or more reflectors;
one or more light sources;
a front covering;
wherein said hood is comprised of a plurality of openings and an interior surface;
wherein said plurality of hood openings is comprised of a front opening and one or more duct openings;
wherein said one or more reflectors are positioned between said interior surface of said hood and said one or more light sources such that a light emitted by said one or more light sources is substantially prevented from reaching an in interior surface of said hood and wherein said light is substantially reflected by said one or more reflectors out of said front opening;
wherein said one or more positioned reflectors creates a front light area and a back dark area in said hood;
wherein said one or more reflectors have a plurality of concealed openings that allow the passage of air between said back dark area and said front light area;
wherein said one or more duct openings are connected to an air flow system that causes air to flow into and out of said hood;
wherein said front covering is transparent;
wherein said front covering creates an air flow chamber within said hood;
wherein said one or more reflectors have a curved concave shape.

2. The light fixture of claim 1, wherein said one or more light sources is comprised of a light bulb socket and a light bulb.

3. The light fixture of claim 2, wherein said plurality of concealed openings comprise a concealed top opening, a concealed socket opening, and one or more concealed corner openings;
wherein said concealed socket opening is adapted to fit around said light bulb socket such that when said light bulb is connected so said light bulb socket, said socket concealed opening is substantially concealed from view.

4. The light fixture of claim 3, wherein said one or more reflectors are comprised of a top reflector;
wherein said top reflector is positioned to substantially conceal said concealed top opening.

5. The light fixture of claim 4, wherein said top reflector is tilted to reflect said light around said light bulb and to prevent said light from reflecting back to said light bulb.

6. The light fixture of claim 5, wherein said one or more reflectors are further comprised of one or more corner reflectors;
wherein said one or more corner reflectors are positioned to substantially conceal one or more concealed corner openings.

7. The light fixture of claim 6, wherein said light fixture promotes the growth of plants.

8. The light fixture of claim 6, further comprising: a power source.

9. The light fixture of claim 6, further comprising: a suspension device.

10. The light fixture of claim 6, wherein said front covering is a hinged door that when opened allows access to said light bulb.

11. A light fixture comprising:
a hood;
a front covering;
a light bulb;
a light bulb socket;
a plurality of reflectors;
wherein said plurality of reflectors are include of a top reflector, a plurality of curved side reflectors, and a plurality of curved concealing corner reflectors;
wherein said hood is substantially hollow and has a front opening, an air flow duct inlet opening, an air flow duct outlet opening, and an interior surface;
wherein said plurality of curved side reflectors are positioned within said hollow hood between said interior surface of said hood and said light bulb such that a light emitted by said light bulb is substantially prevented from reaching said interior surface of said hood, said air flow duct outlet opening, and said air flow duct inlet opening, and wherein said light is substantially reflected by said plurality of reflectors out of said front opening;
wherein said plurality of side reflectors are positioned within said hollow hood such that there is a top opening and a plurality of corner openings between said plurality of side reflectors;
wherein said plurality of curved concealing corner reflectors are positioned within said hollow hood to conceal said plurality of corner openings such that a plurality of concealed corner openings are created, and wherein air is permitted to flow through said plurality of concealed corner openings;
wherein said top reflector is positioned within said hollow hood to conceal said top opening such that a concealed top opening is created, and wherein air is permitted to flow through said concealed top opening;
wherein said air flow duct inlet opening and said air flow duct outlet opening are connected to an air flow system that causes air to flow into said air flow duct inlet opening and causes air to flow out of said air flow duct outlet opening;

wherein said front covering is transparent; wherein said front covering creates an air flow chamber within said hollow hood.

12. The light fixture of claim 11, wherein said plurality of curved side reflectors are substantially concave; and
wherein said plurality of curved concealing corner reflectors are substantially concave.

13. The light fixture of claim 12, wherein one of said plurality of side reflectors has a concealed socket opening;
wherein said concealed socket opening is adapted to fit around said light bulb socket such that when said light bulb is connected to said light bulb socket, said concealed socket opening is substantially concealed.

14. The light fixture of claim 13, wherein said top reflector is tilted to reflect said light around said light bulb and to prevent said light from reflecting back to said light bulb.

15. The light fixture of claim 14, wherein said front covering is a hinged door that when opened, allows access to said light bulb.

16. The light fixture of claim 15, further comprising: a power source.

17. The light fixture of claim 16, further comprising: a suspension device.

* * * * *